(12) United States Patent
Kim et al.

(10) Patent No.: US 12,021,668 B2
(45) Date of Patent: Jun. 25, 2024

(54) EQUALIZATION FOR PULSE-AMPLITUDE MODULATION

(71) Applicant: Micron Technology, Inc., Boise, ID (US)

(72) Inventors: Kang-Yong Kim, Boise, ID (US); Hyun Yoo Lee, Boise, ID (US); Timothy M. Hollis, Meridian, ID (US); Dong Soon Lim, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/562,588

(22) Filed: Dec. 27, 2021

(65) Prior Publication Data

US 2022/0209998 A1 Jun. 30, 2022

Related U.S. Application Data

(60) Provisional application No. 63/131,295, filed on Dec. 28, 2020.

(51) Int. Cl.
*H04L 25/03* (2006.01)
*H04L 25/49* (2006.01)

(52) U.S. Cl.
CPC .... *H04L 25/03057* (2013.01); *H04L 25/4917* (2013.01)

(58) Field of Classification Search
CPC ............ H04B 14/023; H04L 25/03006; H04L 25/03019; H04L 25/03025;
(Continued)

(56) References Cited

U.S. PATENT DOCUMENTS 8,103,898 B2 1/2012 Dimitriu et al.
8,791,735 B1 * 7/2014 Shibasaki ............. H04L 7/0337
327/147
(Continued)

OTHER PUBLICATIONS

"International Search Report and Written Opinion", Application No. PCT/US2021/065333, dated Apr. 13, 2022, 13 pages.
(Continued)

*Primary Examiner* — Young T. Tse
(74) *Attorney, Agent, or Firm* — Colby Nipper PLLC

(57) ABSTRACT

Described apparatuses and methods are directed to equalization with pulse-amplitude modulation (PAM) signaling. As bus frequencies have increased, the time for correctly transitioning between voltage levels has decreased, which can lead to errors. Symbol decoding reliability can be improved with equalization, like with decision-feedback equalization (DFE). DFE, however, can be expensive for chip area and power usage. Therefore, instead of applying DFE to all voltage level determination paths in a receiver, DFE can be applied to a subset of such determination paths. With PAM4 signaling, for example, a DFE circuit can be coupled between an output and an input of a middle slicer. In some cases, symbol detection reliability can be maintained even with fewer DFE circuits by compressing a middle eye of the PAM4 signal. The other two eyes thus have additional headroom for expansion. Encoding schemes, impedance terminations, or reference voltage levels can be tailored accordingly.

43 Claims, 9 Drawing Sheets

(58) Field of Classification Search
CPC ......... H04L 25/03031; H04L 25/03057; H04L 25/03885; H04L 25/4917
USPC ....... 375/229, 232, 233, 287, 288, 348, 350, 375/353; 708/322, 323
See application file for complete search history.

(56) References Cited

U.S. PATENT DOCUMENTS

| | | | |
|---|---|---|---|
| 9,385,894 B2* | 7/2016 | Ogata | H04L 25/03057 |
| 10,038,575 B1* | 7/2018 | Steffan | H04L 27/01 |
| 10,425,260 B2* | 9/2019 | Hollis | H04L 25/4917 |
| 10,491,238 B2 | 11/2019 | Sudhakaran et al. | |
| 10,848,353 B1 | 11/2020 | Dong et al. | |
| 2007/0230640 A1 | 10/2007 | Bryan et al. | |
| 2014/0153620 A1* | 6/2014 | Longo | H04L 27/02 375/219 |
| 2018/0131443 A1 | 5/2018 | Gopalakrishnan et al. | |
| 2020/0084069 A1* | 3/2020 | Rane | H04L 25/03057 |
| 2020/0145111 A1 | 5/2020 | Franck et al. | |
| 2020/0145261 A1 | 5/2020 | Navid | |
| 2020/0220659 A1* | 7/2020 | Riani | H04L 25/067 |
| 2021/0266200 A1* | 8/2021 | Yang | H04L 25/4917 |
| 2022/0191069 A1* | 6/2022 | Dong | H04L 25/0272 |

OTHER PUBLICATIONS

"International Preliminary Report on Patentability", Application No. PCT/US2021/065333, dated Jul. 4, 2023, 9 pages.

* cited by examiner

EQUALIZATION FOR PULSE-AMPLITUDE MODULATION

RELATED APPLICATION

This application claims priority under 35 U.S.C. § 119(e) to U.S. Provisional Patent Application 63/131,295, filed on 28 Dec. 2020, which is incorporated herein by reference in its entirety.

BACKGROUND

Computers, smartphones, and other electronic devices operate using processors and memories. A processor executes code based on data to run applications and provide features to a user. The processor obtains the code and the data from a memory that can store information. Thus, like a processor's speed or number of cores, a memory's characteristics can impact the performance of an electronic device. Different types of memory have different characteristics. Memory types include volatile memory and nonvolatile memory, such as random access memory (RAM) and flash memory, respectively. RAM can include static RAM (SRAM) and dynamic RAM (DRAM).

Demands on the different types of memory continue to evolve and grow. For example, as processors are engineered to execute code faster, such processors can benefit from accessing memories more quickly. Applications may also operate on ever-larger data sets that use ever-larger memories. Due to battery-powered electronic devices and power-hungry data centers, energy-usage constraints are becoming more prevalent for memory systems. Further, manufacturers may seek smaller memories as the form factors of portable electronic device continue to shrink. Accommodating these various demands is thus complicated by the diverse strengths and capabilities of different types of memories.

BRIEF DESCRIPTION OF THE DRAWINGS

Apparatuses of and techniques for pulse-amplitude modulation equalization are described with reference to the following drawings. The same numbers are used throughout the drawings to reference like features and components:

FIG. 4-1 illustrates an example receiver that can implement equalization for pulse-amplitude modulation with one decision-feedback equalizer (DFE);

FIG. 4-2 illustrates an example receiver that can implement equalization for pulse-amplitude modulation with multiple decision-feedback equalizers (DFEs);

DETAILED DESCRIPTION

Overview

Figure 1:
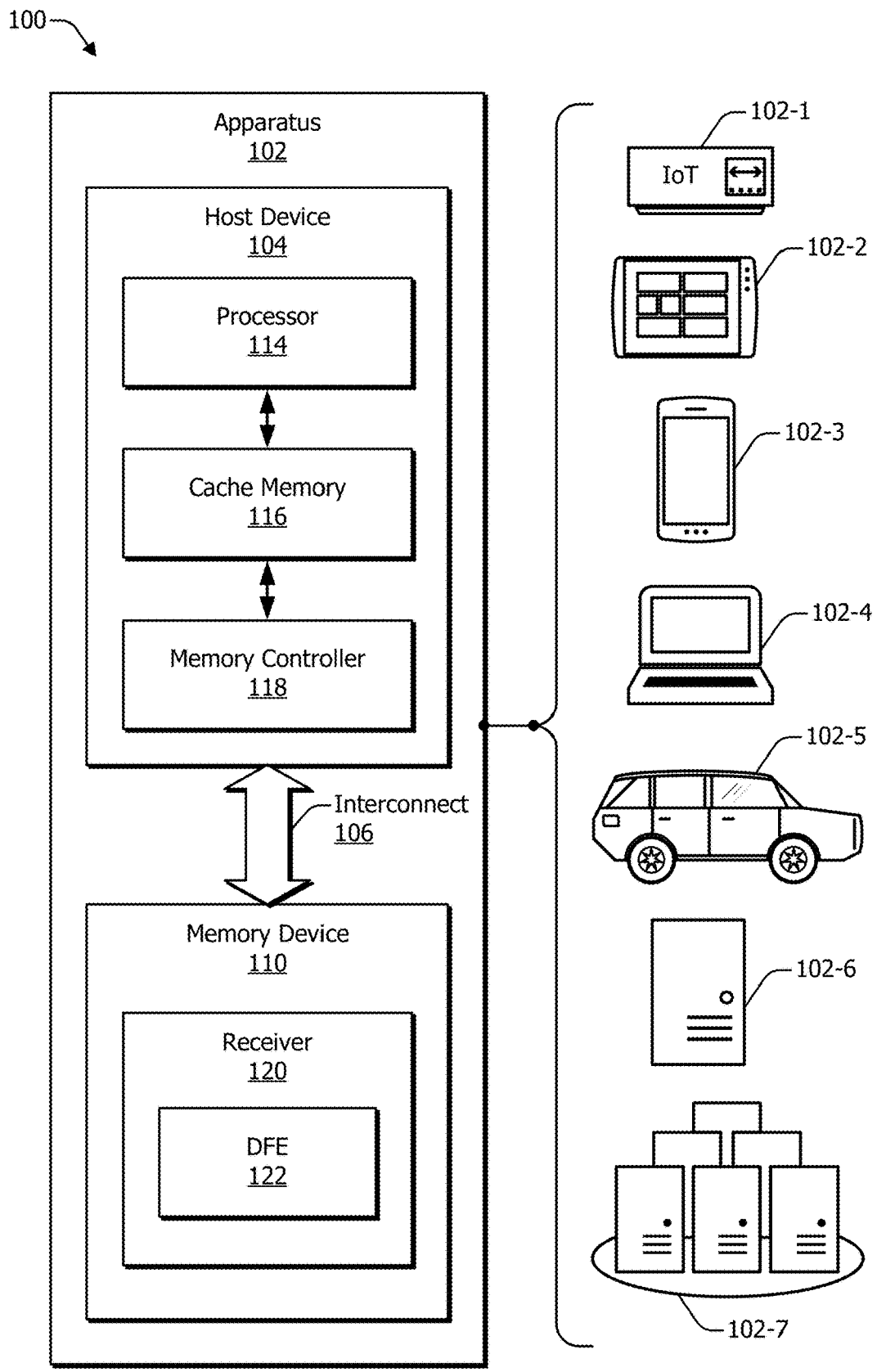
FIG. 1 illustrates example apparatuses that can implement equalization with pulse-amplitude modulation.

Computing systems can include a host device and a memory device. In some cases, the host device includes a processor and a memory controller, and the memory device includes a memory array to store data and other information. The memory controller can interact with the memory device to cause the memory device to hold information on behalf of the processor, perhaps many gigabytes of information that is stored in a RAM. The memory controller communicates with the memory device via an interconnect that is coupled between the host device and the memory device. For example, the memory controller can send commands to the memory device to perform read operations, write operations, or a combination thereof. The memory controller may include a transmitter and a receiver for communicating with the memory device. The memory device may likewise include a transmitter and a receiver for communicating with the memory controller. As such, techniques and hardware described herein that are associated with a receiver or a transmitter may be implemented with the memory device, the memory controller, or a combination thereof.

The memory controller and the memory device may communicate by exchanging (e.g., transmitting or receiving) symbols that represent one or more bits (e.g., a "01," a "11," or a "101"). Consider a situation in which the data throughput between the memory controller and the memory device may be limited by the number of symbols (e.g., amount of encoded information) transmitted per symbol period. As an example, a signal that undergoes pulse-amplitude modulation (PAM) that is called a non-return-to-zero (NRZ) signal may include a binary encoding to transfer information with a particular data rate per symbol period (e.g., one bit per symbol). A four-level PAM signal (e.g., PAM4) with four discrete pulse amplitudes may be used to double the data rate in comparison with the NRZ signal. A PAM4 signal can communicate two bits per symbol. In kind, an eight-level PAM signal (e.g., a PAM8 signal) with eight discrete pulse amplitudes may be implemented to double the symbol rate in comparison with the PAM4 signal, thereby reaching three bits per symbol. The increasing number of voltage levels, which corresponds to the increasing number of discrete pulse amplitudes that are associated with higher orders of PAM signaling, can increase inter-symbol interferences (ISI), crosstalk, and other negative signal integrity metrics.

A decision-feedback equalizer (DFE) may be applied to a PAM signal to reduce ISI and other signal integrity issues. In an example in which the encoding level of the PAM signal is greater than two (e.g., PAM4 or PAM8), a received signal at a memory device or a memory controller can be equalized using, e.g., decision-feedback equalization to improve symbol detection. In such cases, the DFE may be applied to all the split signals that are produced from a received signal. Applying DFE to all the split signals, however, can be expensive in terms of power usage. Further, including DFE circuitry that can process all the split signals adds appreciably to a size of an integrated circuit (IC) chip that receives higher-order PAM signals, and the larger size increases the cost of the IC chip.

To process PAM signals, a receiver at a memory controller or a memory device can include an input interface, one or more slicers, and a decoder. The input interface can include an input data line that splits into multiple data lines. Thus, a received signal is split into multiple split signals that propagate over the multiple data lines. A respective data line of the multiple data lines is coupled to a respective slicer of the one or more slicers. With PAM4, for instance, the receiver can include three data lines and three slicers. A respective slicer can process a split signal relative to a respective reference voltage. To do so, the respective slicer determines if the split signal is greater than or less than the respective reference voltage. Signals (e.g., digital signals) representing these determinations are forwarded to the decoder to produce multiple bits per symbol with higher-order PAM signaling. To increase the reliability of a comparison performed by a slicer, a DFE circuit can be coupled to the slicer to perform equalization on the split signal being processed. Equalization may be applied to all the slicers of a receiver.

Figure 7:
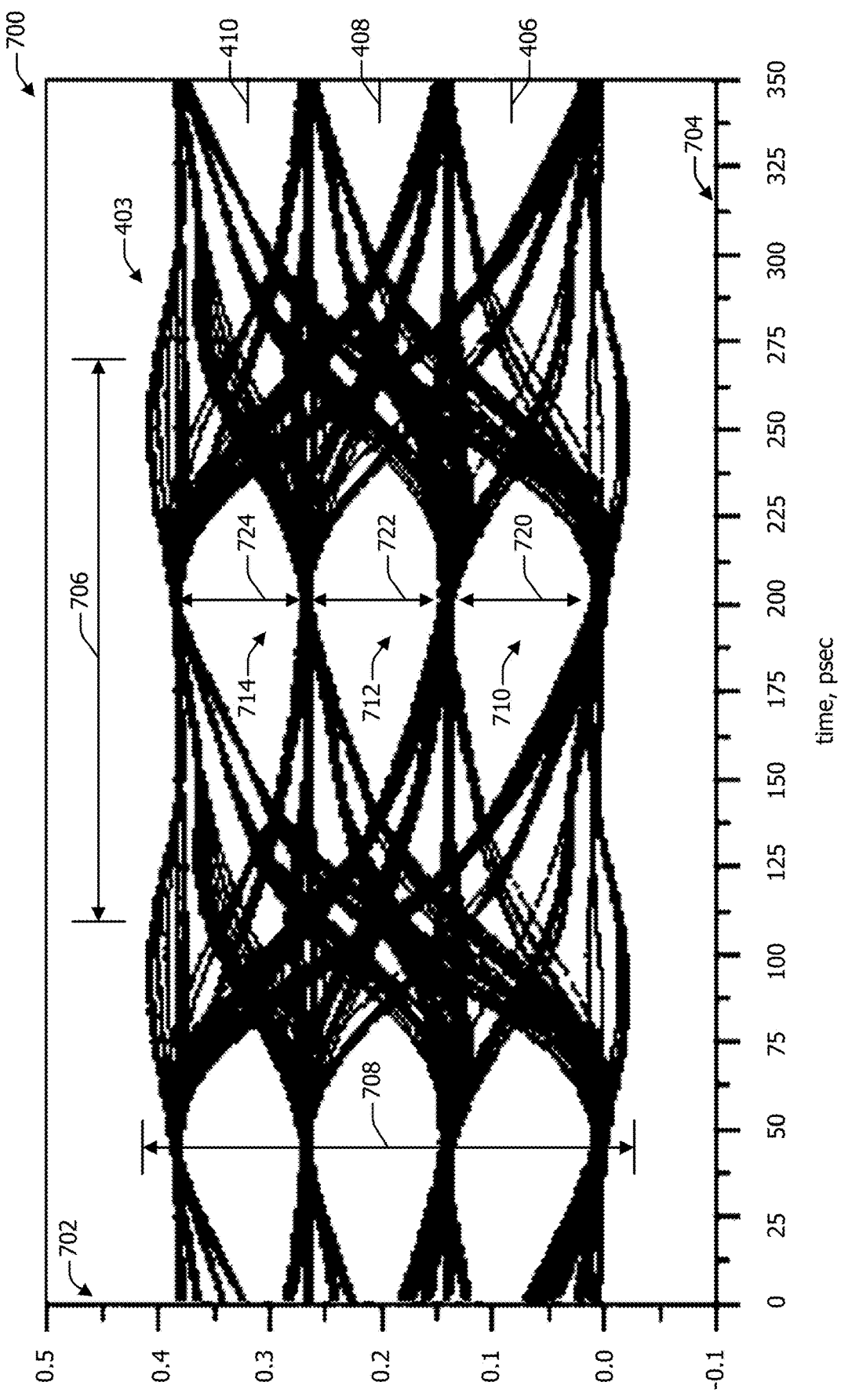
FIG. 7 illustrates an example signal having four pulse-amplitude-modulated levels that can be used with equalization for pulse-amplitude modulation.

In examples described by this document, however, equalization may be applied to fewer than all the split signals that are being processed by the multiple slicers for forwarding to the decoder. The decoder is responsible for converting the digital signals output by the slicers into a symbol or the data bits corresponding thereto. As an example, a PAM4 signal may have slicer levels respectively associated with multiple eyes of the PAM4 signal (e.g., high, middle, and low levels for a three-eyed PAM4 signal). An example PAM4 signal that includes multiple eyes is depicted at FIG. 7.

The eyes of the PAM signal may have respective eye heights that physically or effectively change based on an encoding scheme of the signal, impedances associated with the received signal, applied reference voltage levels, and/or other equalization applied to the signal. As an example, the middle or center eye of a PAM4 signal may become compressed relative to other eyes of the PAM4 signal based on an encoding scheme. For instance, an encoding that reduces or removes extreme symbol transitions (e.g., by limiting or avoiding transitions between the lowest voltage level and the highest voltage level of the PAM4 signal) may compress the middle eye or other selected eye(s). As another example, adjustments to on-die terminations (e.g., VssQ or VddQ) or other impedance alterations may cause compression, expansion, or other skewing of the eye heights.

In example implementations, DFE may be applied to fewer than all the split signals, fewer than all slicers, or fewer than all symbol decisions. The DFE circuit may further be applied to the split signal(s) associated with the more or most affected eyes. For instance, the symbol decisions associated with one of the eyes may become more affected by noise because as the eye height decreases, the voltages of the PAM signal may move closer to the slicer threshold level (e.g., the reference voltage level). Applying DFE to such symbol decisions, in conjunction with omitting DFE from other symbol decisions, allows for a reduced equalization footprint and lower power consumption.

In the simplified example presented above, any number of taps may be used by the DFE circuitry The DFE circuitry can include a summation block coupled to the split data line being equalized. In some cases, the DFE may provide feedback from the symbol decision associated with the DFE summation block. In other cases, the DFE may provide feedback from one or more of the other symbol decisions that are not associated with the DFE summation block. Further, the DFE may provide feedback from any combination of the symbol decisions made by the slicers. Any number of feedback loops from any of the symbol decisions may be used. In addition, DFEs may be coupled to any of the split data lines at the slicer inputs, respectively, and the DFEs may be selectively engaged. Alternatively, fewer DFEs, or even a single DFE, can be selectively coupled to a given slicer for activation on the corresponding split signal. In other implementations, a DFE may be coupled to a given slicer, but reference voltages may be switchably applied to adjust which eye of the PAM signal is being equalized. The decoding can be adjusted accordingly, too. Selective engagement of at least one DFE at the memory device may be based on a command determined at or provided by the memory controller.

In some implementations, the memory controller may perform initialization testing or an update analysis with the memory device by transmitting and receiving data with the memory device and adjusting various parameters to reduce error associated with the exchanged data. In an example, the memory controller may adjust the signal encoding, termination impedance, activated DFE(s), slicer thresholds, or a combination thereof to determine a desired configuration based on the error associated with the test data (e.g., the transmitted or received data). For instance, the memory controller may recognize, based on the error associated with the test data, that an encoding scheme that maximizes the top and bottom eye heights of a PAM signal reduces error. The memory controller may further recognize that increases to the top and bottom eye heights increases error associated with the middle eye. The memory controller may include logic to recognize errors associated with the middle eye symbols and transmit a command to configure the receiver by applying decision-feedback equalization to the middle eye. A configuration command may adjust signal encoding, termination impedances, slicer thresholds, DFE activation(s) or coupling(s) to slicer paths, and so forth. To selectively engage a DFE, the configuration command may direct the memory device to close a switch to operatively couple the DFE to a middle data line for the middle eye or a subset of split signals including the middle split signal associated with the middle eye.

Thus, this document describes examples for equalization with pulse-amplitude modulation. A subset of the split signals being evaluated to determine a transmitted symbol is processed using an equalizer, such as a DFE circuit. Described approaches can increase data reliability while avoiding the costs and power increases that are associated with applying DFE to all split signals. These approaches can be facilitated by apply techniques that "unbalance" eye heights in a PAM signal. The DFE can be selectively applied to an eye height that is less than other eye heights of the PAM signal. Accordingly, implementing the described approaches can reduce power consumption, improve access times by enabling higher transmission frequencies, decrease costs, and therefore improve the user experience with memory systems. These are but a few examples of how the described techniques and devices may be used to improve the signal integrity of transmitted data, including data transmitted in memory systems. Other examples and implementations are described throughout this document. The document now turns to an example operating environment, after which example devices, methods, and systems are described.

Example Operating Environments

FIG. 1 illustrates, at 100 generally, example apparatuses 102 that can implement equalization for pulse-amplitude modulation. The apparatus 102 can be realized as, for example, at least one electronic device. Example electronic-device implementations include an internet-of-things (IoTs) device 102-1, a tablet device 102-2, a smartphone 102-3, a notebook computer 102-4 (or desktop computer), a passenger vehicle 102-5, a server computer 102-6, a server cluster 102-7 that may be part of cloud computing infrastructure or a data center, and a portion thereof (e.g., a printed circuit board (PCB)). Other examples of the apparatus 102 include a wearable device, such as a smartwatch or intelligent glasses; an entertainment device, such as a set-top box, a smart television, or a gaming device; a motherboard or server blade; a consumer appliance; a vehicle or drone, or the electronic components thereof; industrial equipment; a security or other sensor device; and so forth. Each type of electronic device or other apparatus can include one or more components to provide some computing functionality or feature.

In example implementations, the apparatus 102 can include at least one host device 104, at least one interconnect 106, and at least one memory device 110 (e.g., a main memory). The host device 104 can include at least one processor 114, at least one cache memory 116, and at least one memory controller 118. The interconnect 106 can include at least one command and address bus and at least one data bus (not explicitly shown). Each bus may be implemented as a unidirectional bus or a bidirectional bus. The interconnect 106 may also include a clock bus that is part of or separate from the command and address bus. The memory device 110 may be realized, for example, with a dynamic random-access memory (DRAM) device or module, including with a three-dimensional (3D) stacked DRAM device, such as a high bandwidth memory (HBM) device or a hybrid memory cube (HMC) device.

Regarding the host device 104, the processor 114 is communicatively coupled to the cache memory 116, and the cache memory 116 is communicatively coupled to the memory controller 118. The processor 114 is also communicatively coupled, directly or indirectly, to the memory controller 118. The host device 104 may include other components to form, for instance, a system-on-a-chip (SoC). The processor 114 may include or comprise a general-purpose processor, a central processing unit (CPU), a graphics processing unit (GPU), a neural network engine or accelerator, an application-specific integrated circuit (ASIC), a field-programmable gate array (FPGA) integrated circuit (IC), a communications processor (e.g., a modem or baseband processor), an SoC, and so forth. In operation, the memory controller 118 can provide a high-level or logical interface between the processor 114 and at least one memory (e.g., a memory that is external to the host device 104). The memory controller 118 can, for example, receive memory requests from the processor 114 and provide the memory requests to the external memory with appropriate formatting, timing, reordering, and so forth. The memory controller 118 can also forward to the processor 114 responses to the memory requests that are received from the external memory.

Regarding connections that are external to the host device 104, the host device 104 is communicatively coupled to the memory device 110 via the interconnect 106. The depicted interconnect 106, as well as other interconnects (not shown) that communicatively couple together various components, enable data to be transferred between two or more ones of the various components. Interconnect examples include a bus, a switching fabric, one or more wires that carry voltage or current signals, and so forth.

The depicted components of the apparatus 102 represent an example computing architecture with a hierarchical memory system. A hierarchical memory system may include memories at different levels, with each level having a memory with a different speed or capacity. As shown, the cache memory 116 may be logically coupled between the processor 114 and the memory device 110. Although not shown, the hierarchical memory system may include other memories or hierarchical levels. For example, the apparatus 102 may include a cache memory that is coupled between the host device 104 and the memory device 110, may include storage memory that is coupled "below" the memory device 110, and so forth.

Although various implementations of the apparatus 102 are depicted in FIG. 1 and described herein, an apparatus 102 can be implemented in alternative manners. For example, the host device 104 may include multiple cache memories, including multiple levels of cache memory, or may have no cache memory. In some cases, the host device 104 may omit the processor 114. Another memory may have a respective "internal" or "local" cache memory (not shown). Further, there may be a cache memory between the interconnect 106 and the memory device 110 (e.g., the main memory). Generally, the illustrated and described components may be implemented in alternative ways, including in distributed or shared memory systems. A given apparatus 102 may also include more, fewer, or different components than those that are illustrated or described herein.

The memory device 110 may include a receiver 120 for communicating over the interconnect 106. The receiver may further include a decision-feedback equalizer (DFE) 122 or multiple decision-feedback equalizers. As discussed above, a receiver 120 may be disposed on or otherwise included with the memory device 110, the memory controller 118, or both. Further, the memory device 110 or the memory controller 118 may include transmitters for communications over the interconnect 106. As such, techniques discussed throughout this disclosure may be performed from the standpoint of the memory device 110 or the memory controller 118. As such, duplicative discussion has been omitted for brevity.

The host device 104 and the various memories may be realized in multiple manners. In some cases, the host device 104 and the memory device 110 can both be disposed on, or physically supported by, a same printed circuit board (PCB) (e.g., a rigid or flexible motherboard). The host device 104 and the memory device 110 may additionally be integrated on a same IC or fabricated on separate ICs but packaged together. A memory may also be communicatively coupled to multiple host devices 104 via one or more interconnects 106 and may be able to respond to memory requests from two or more of the host devices. Each host device 104 may include a respective memory controller 118, or the multiple host devices 104 may share a common memory controller 118. An example architecture with at least one host device 104 that is communicatively coupled to a memory device is described next.

Figure 2:
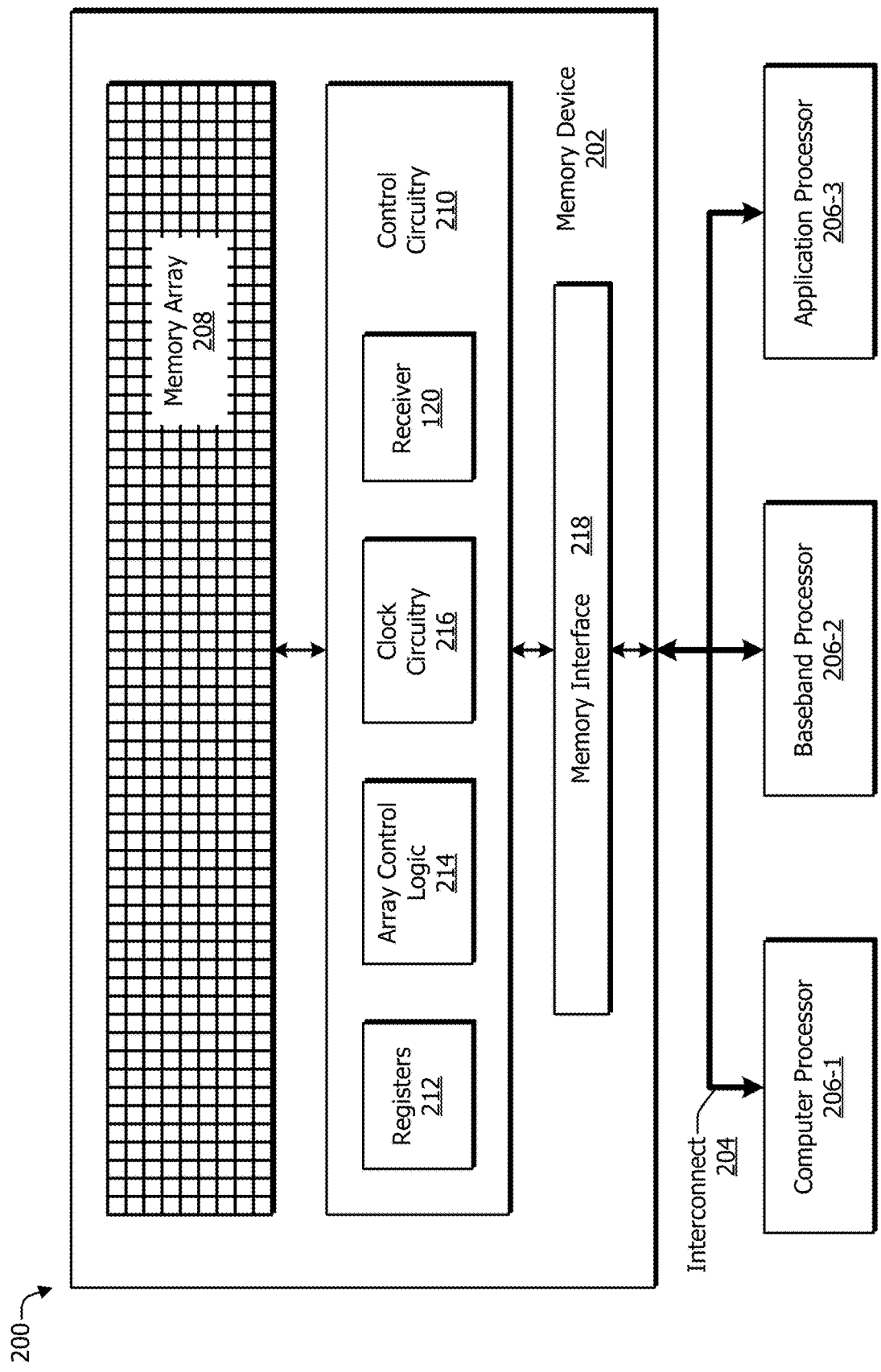
FIG. 2 illustrates example computing systems that can implement equalization with pulse-amplitude modulation.

FIG. 2 illustrates example computing systems 200 that can implement aspects of equalization for pulse-amplitude modulation. In some implementations, the computing system 200 includes at least one memory device 202, at least one interconnect 204, and at least one processor 206. The memory device 202 can include, or be associated with, at least one memory array 208, at least one memory interface 218, and control circuitry 210 that is communicatively coupled to the memory array 208. The memory device 202 can correspond to the cache memory 116, the memory device 110, storage memory (not shown), and so forth. Thus, the memory array 208 can include an array of memory cells, including but not limited to memory cells of Dynamic Random-Access Memory (DRAM), Synchronous DRAM (SDRAM), three-dimensional (3D) stacked DRAM, Double Data Rate (DDR) memory, Graphics Double Data Rate (GDDR) memory SDRAM, or Low-Power DDR (LPDDR) SDRAM. The memory array 208 and the control circuitry 210 may be components on a single semiconductor die or on separate semiconductor dies. The memory array 208 or the control circuitry 210 may also be distributed across multiple dies.

The control circuitry 210 can include any of a number of components that can be used by the memory device 202 to perform various operations (e.g., communicate with other devices, manage performance, and perform memory read or write operations). For example, the control circuitry 210 can include one or more registers 212, at least one instance of array control logic 214, and clock circuitry 216. The registers 212 may be implemented, for example, as one or more registers that can store information to be used by the control circuitry 210 or another part of the memory device 202. The array control logic 214 may be implemented as circuitry that can provide command decoding, address decoding, input/output functions, amplification circuitry, power supply management, power control modes, signal transmission or reception, data encoding or decoding, and other functions. The clock circuitry 216 may be implemented as circuitry that can provide synchronization of various components of the memory device 202 with one or more external clock signals that may be provided over the interconnect 204, such as a command/address clock (e.g., CK_t or CK_c) or a data clock (e.g., WCK_t or WCK_c), and/or with at least one clock signal that is generated internally.

The memory interface 218 can couple the control circuitry 210 or the memory array 208 directly or indirectly to the interconnect 204. As shown in FIG. 2, the registers 212, the array control logic 214, and the clock circuitry 216 can be part of a single component (e.g., the control circuitry 210). In other implementations, one or more of the registers 212, the array control logic 214, or the clock circuitry 216 may be implemented as separate components, which can be provided on a single semiconductor die or disposed across multiple semiconductor dies. These components of the control circuitry 210 may be individually or jointly communicatively coupled to the interconnect 204 via the memory interface 218.

The interconnect 204 may be implemented with any one or more of a variety of interconnects that communicatively couple together various components and enable commands, addresses, and/or other information and data to be transferred between two or more of the various components (e.g., between the memory device 202 and the host device 104). Although the interconnect 204 is represented with a single arrow in FIG. 2, the interconnect 204 may include a bus, a switching fabric, one or more wires or traces that carry voltage or current signals, at least one switch, one or more buffers, and so forth. Further, the interconnect 204 may be separated into at least a command-and-address (CA) bus and a data (DQ) bus.

In some aspects, the memory device 202 may be realized as a "separate" physical component relative to the host device 104 of FIG. 1. Examples of physical components, which may be separate, include: a printed circuit board (PCB), which can be rigid or flexible; a packaged chip; a memory card; a memory stick; a memory module, including a single in-line memory module (SIMM) or a dual in-line memory module (DIMM); and so forth. Alternatively, the memory device 202 may be packaged or integrated with other physical components-including the host device 104, such as by being combined on a common PCB or together in a single device package.

The apparatuses and methods that are described herein may be appropriate for memory that is designed for lower power operations or that is targeted for energy-efficient applications. Thus, the described principles may be incorporated into a low-power memory device. An example of a memory standard that relates to low-power applications is the Low-Power Double Data Rate (LPDDR) standard for synchronous DRAM (SDRAM) as promulgated by the Joint Electron Device Engineering Council (JEDEC) Solid State Technology Association. Some terminology in this document may draw from one or more of these standards or versions thereof, like the LPDDR5 standard, for clarity. The described principles, however, are also applicable to memories that comport with other standards, including other LPDDR standards (e.g., earlier versions or future versions like LPDDR6), and to memories that do not adhere to a public standard. Additionally or alternatively, the memory device 202 may be realized as, for example, graphics memory that comports with a graphics memory standard like the Graphics Double Data Rate type 5 or 6 (GDDR5 or GDDR6) standard. Some terminology in this document may draw from one or more of these standards or versions thereof, like the GDDR6 standard, for clarity. The described principles, however, are also applicable to memories that comport with other standards, including other GDDR standards (e.g., earlier versions or future versions like a GDDR7), and to memories that do not adhere to a public standard or to a graphics standard.

As shown in FIG. 2, the one or more processors 206 may include a computer processor 206-1, a baseband processor 206-2, and/or an application processor 206-3. These processors may be coupled to the memory device 202 through the interconnect 204. The processors 206 may each be a CPU, a GPU, an SoC, an ASIC, an FPGA, or the like. In some cases, a single processor comprises multiple processing cores or other resources, each dedicated to different functions, such as modem management, applications, graphics, central processing, or the like. In some implementations, the baseband processor 206-2 may include or be coupled to a modem (not shown in FIG. 2) and may be referred to as a modem processor. The modem and/or the baseband processor 206-2 may be coupled wirelessly to a network via, for example, cellular, Wi-Fi®, Bluetooth®, near field, or another technology or protocol for wireless communication.

In some implementations, the processors 206 may be connected directly to the memory device 202 (e.g., via the interconnect 204). In other implementations, one or more of the processors may be indirectly connected to the memory device 202 (e.g., over a network connection or through one or more other devices), which indirect connection may also include the interconnect 204. Further, each processor 206 may be realized similarly to the processor 114 of FIG. 1. Accordingly, a respective processor 206 can include or be associated with a respective memory controller, like the memory controller 118 depicted in FIG. 1. Alternatively, two or more processors 206 may access the memory device 202 using a shared or system memory controller 118.

In example implementations for equalization with pulse-amplitude modulation, the control circuitry 210 can include the receiver 120 (of FIG. 1). Accordingly, the control circuitry 210 can include one or more DFE circuits 122 to provide equalization for at least one split signal received by the receiver 120 from the interconnect 106. In the following section, an example communication arrangement with at least one receiver 120 is described next with reference to FIG. 3. Example implementations of a receiver 120 are then described with reference to FIGS. 4-1 and 4-2.

Depicted and described components may be coupled to together communicatively and/or operatively. Such components may, for instance, be coupled with a conductive connection. It should be appreciated that a conductive connection may correspond at least to any common electrical or light based connection intended by a system designer. Although many materials conduct to some degree, a conductive connection is one that was intended or architected to conduct a signal. A conductive connection may include any association of parts having, for example, a conductivity greater than 1.00 S/m at 20° C. Conductive connection does not necessarily require unitarily implemented conductors. Further, a conductive connection may include any number of breaks and interruptions, including interconnections, switches, buffers, and other implements to provide conductive connections between two or more components.

Example Techniques and Hardware

Figure 3:
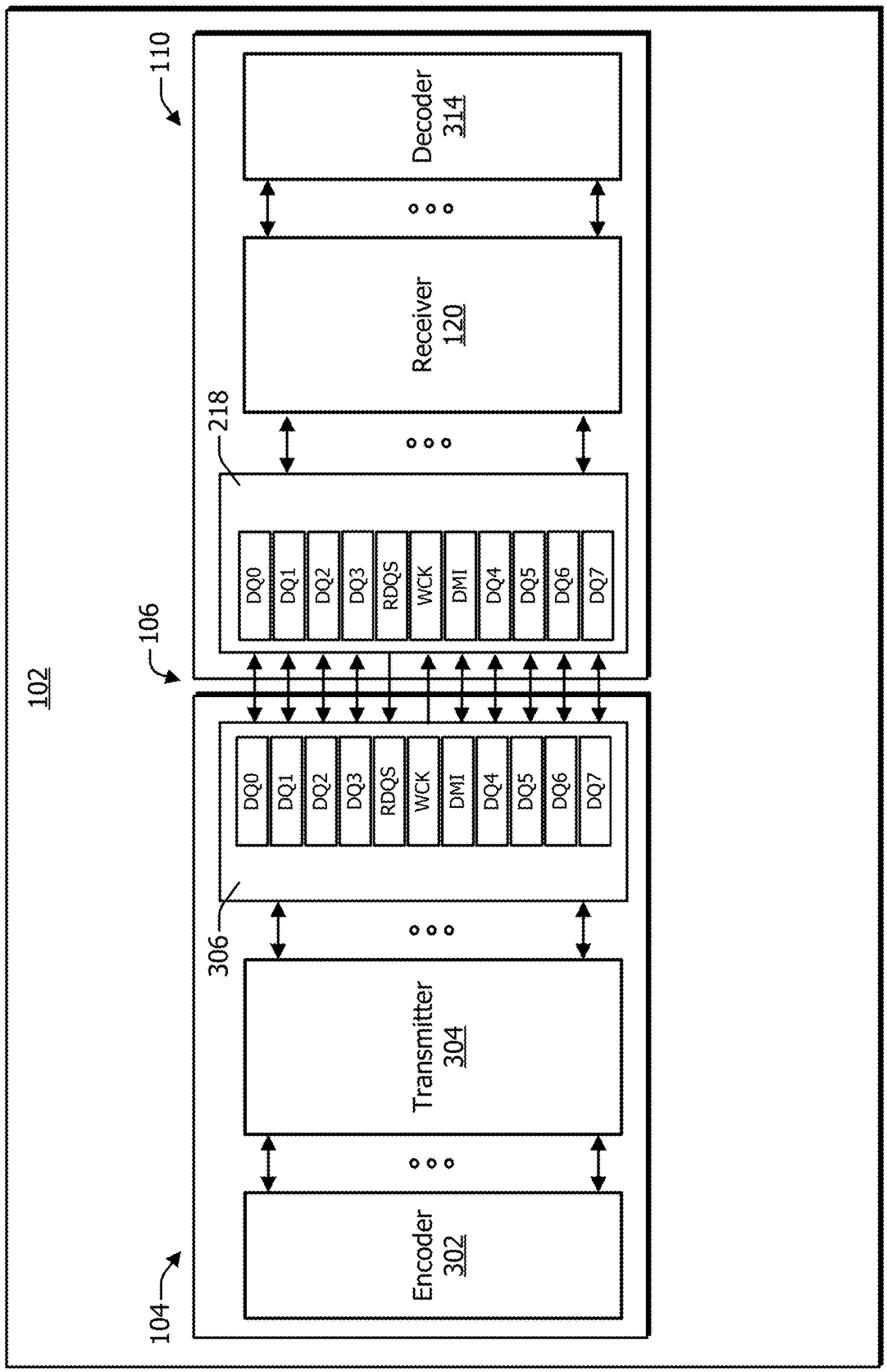
FIG. 3 illustrates examples of an interconnect, a host device, and a memory device that can implement equalization with pulse-amplitude modulation.

FIG. 3 illustrates examples of an interconnect 106, a host device 104, and a memory device 110 that can implement equalization for pulse-amplitude modulation. Thus, the apparatus 102 can include the host device 104 and the memory device 110. The host device 104 and/or the memory device 110 may be realized as a system on a chip (SoC). The host device 104 may include an encoder 302, a transmitter 304, and a host interface 306. As shown, the host interface 306 may be coupled to the encoder 302 and the transmitter 304. The encoder 302 may be any type of encoder, such as one that converts data to symbols. The encoder 302 may, for instance, be a PAM4 or PAM8 encoder. The encoder 302 may, however, implement any encoding strategy or schema. Examples include linear encoding, grey encoding, and maximum transition avoidance encoding.

The transmitter 304 may be of any type, such as a finite impulse response (FIR) filter or similar. The transmitter 304 may include or be coupled to any number of data lines for reading or writing data. The transmitter 304 may be coupled to the interconnect 106 via the host interface 306. The host interface 306 is coupled to (e.g., in electrical communication with) the interconnect 106. The memory device 110 may include the memory interface 218, the receiver 120, and a decoder 314. The interconnect 106 includes multiple data lines that provide electrical communication between the host interface 306 and the memory interface 218. The memory interface 218 is coupled to the receiver 120 and the decoder 314. The data lines of the interconnect 106 may correspond to DQ lines, read strobe lines, write clock lines, write mask lines, or other memory communication lines. An LPDDR SDRAM, for example, may include DQ pins in accordance with one or more versions of the standard. The DQ pins depicted in FIG. 3 may comport with LPDDR5. Nonetheless, other implementations may have more pins, fewer pins, and/or different pins, as well as more data lines, fewer data lines, and/or different data lines.

In example operations, the receiver 120 of the memory device 110 receives information from the transmitter 304 over the interconnect 106 through the memory interface 218. The receiver 120 can include circuitry to slice data signals received from the data lines of the interconnect 106 and through the interface 218. The data slicers accept analog signals from the memory interface 218 and produce digital signals, as described herein below. The digital signals can be sent from the receiver 120 to the decoder 314 for symbol aggregation. The receiver 120 and the decoder 314 may be implemented as a unitary component or a combination of components. In FIG. 3, the host device 104 is depicted with a transmitter 304, and the memory device 110 is depicted with a receiver 120. However, either may have both a transmitter and a receiver. For example, the host device 104 may include circuitry similar to the receiver 120 and the decoder 314, and the memory device 110 may include circuitry similar to the encoder 302 and the transmitter 304. Such an implementation can provide bidirectional communication between the host device 104 and the memory device 110. Accordingly, the host device 104 or the memory device 110 may practice any or all of the techniques described herein for equalization with pulse-amplitude modulation.

Figures 1, 4:
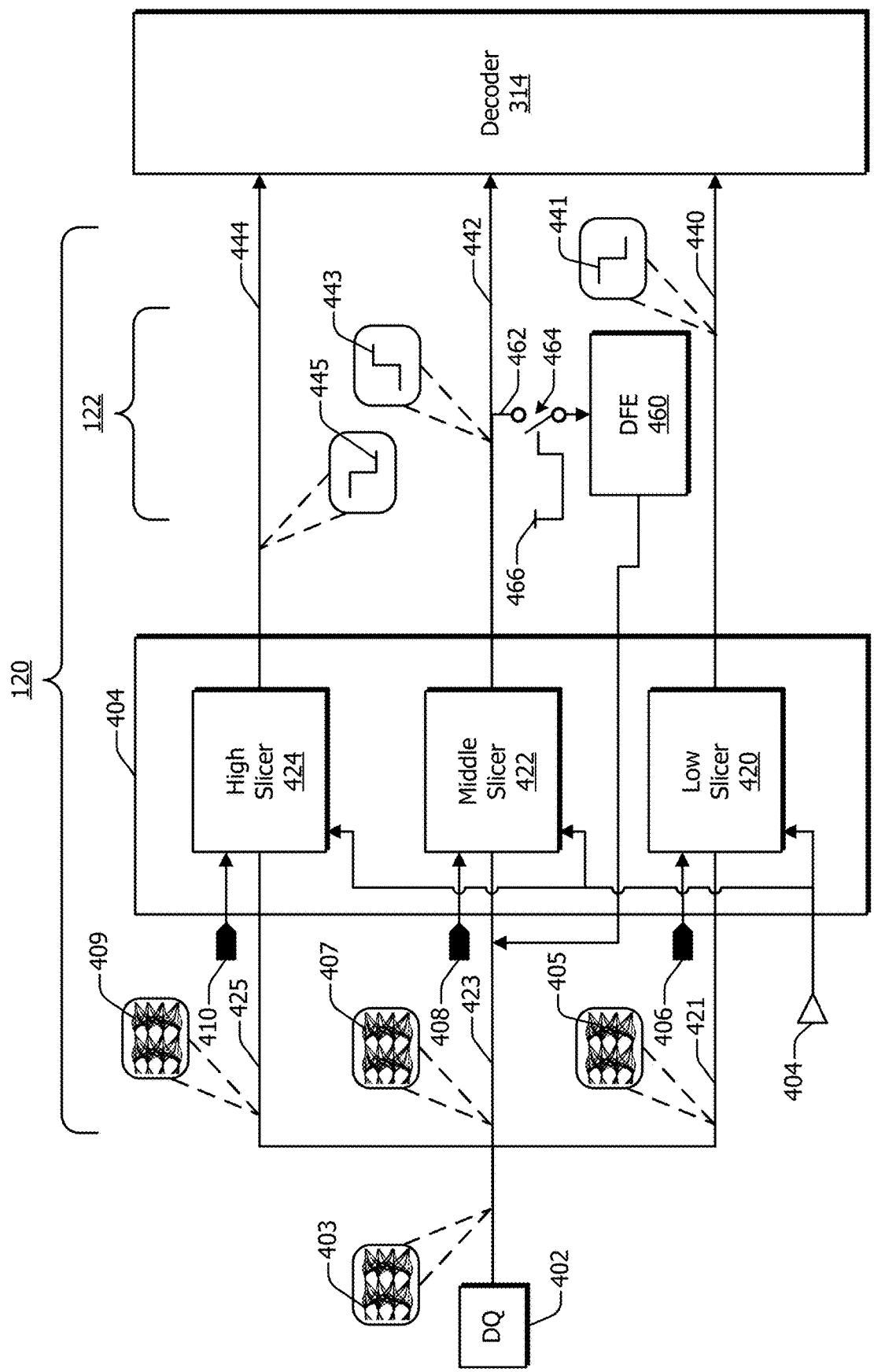
Figures 2, 4:
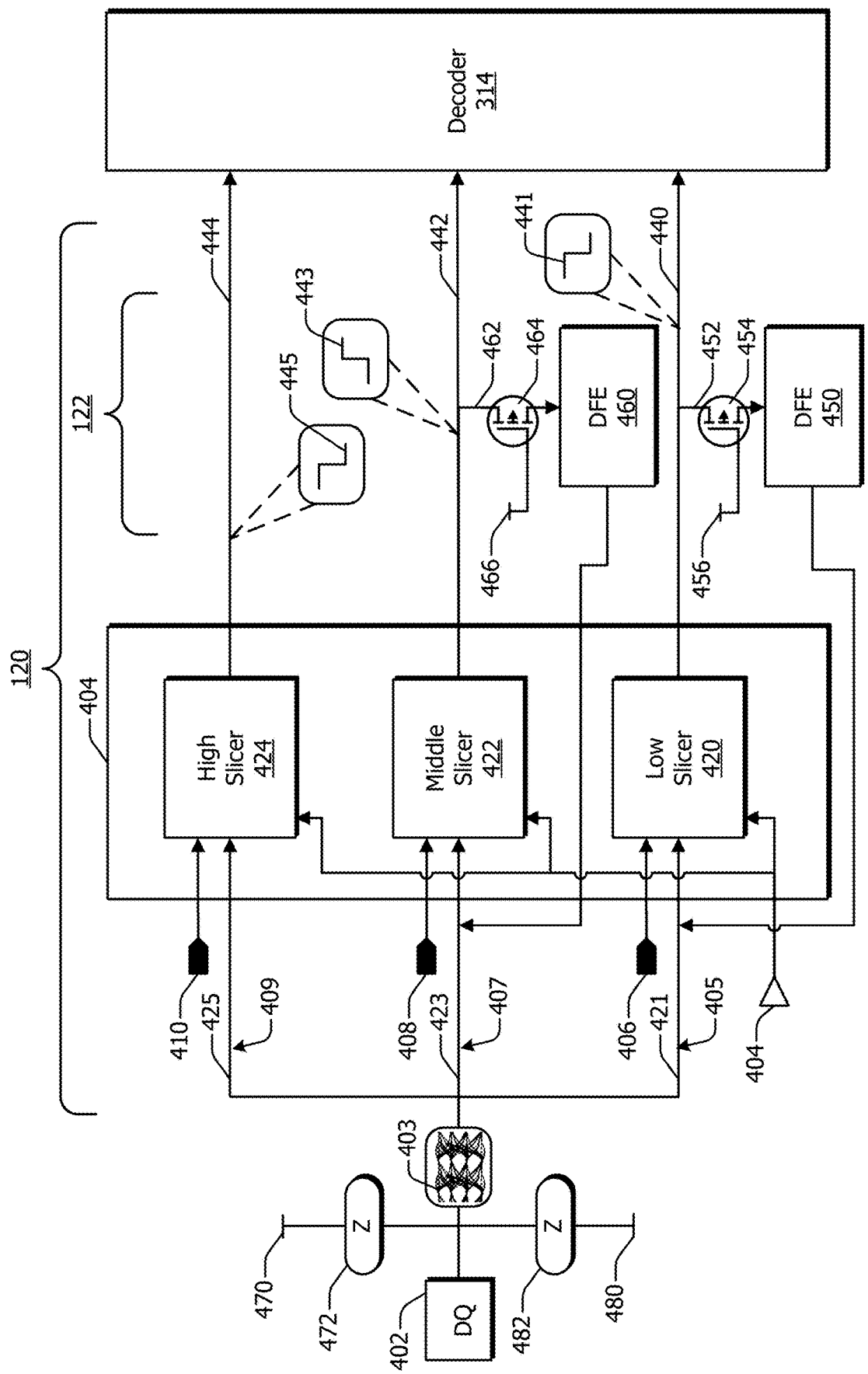

FIG. 4-1 illustrates an example receiver 120 that can implement equalization with pulse-amplitude modulation with one decision-feedback equalizer (DFE). The receiver 120 may be implemented on the host device 104, the memory device 110, or both. The receiver 120 is coupled to a data line 402 (DQ) of the multiple data lines that traverse the interconnect 106. Such data lines may include read strobes, write clocks, write masks, and the like in addition to lines that propagate data symbols or bits. The data line 402 can carry a signal 403. The signal 403 may be pulse-amplitude modulated (PAM). The signal 403 may have any number of voltage levels corresponding to encoded data. If the signal 403 is a PAM4 signal, the signal 403 may include voltage levels corresponding to two-bit encoded binary data. Thus, the voltage levels may range across −3, −1, 1, 3 Volts or a multiple thereof (e.g., −1, −⅓, ⅓, 1 Volts). The signal 403 can, however, range across more voltage levels or different voltage levels. The signal 403 may also be implemented as a PAM8 signal or another higher-order PAM signal with multiple voltage levels.

As shown in the example illustration, the data line 402 and the signal 403 are split into a first split data line 421 carrying a first split signal 405, a second split data line 423 carrying a second split signal 407, and a third split data line 425 carrying a third split signal 409. The slicer circuitry 404 may include multiple slicers, such as a first slicer, a second slicer, and a third slicer. The first split data line 421 carries the first split signal 405 to the slicer circuitry 404, and more specifically, to the low slicer 420 having a low voltage level 406 (e.g., −2 V) defined between the two lowest voltage levels (e.g., −3 V, −1 V). The low slicer 420 may slice the first split signal 405 into discrete values according to a clock 404.

The second split data line 423 carries the second split signal 407 to the slicer circuitry 404, and more specifically, to the middle slicer 422 associated with a middle voltage level 408 (e.g., 0 V) defined between the two middle voltage levels (e.g., −1 V, 1 V). The middle slicer 422 may slice the second split signal 407 into discrete values according to the clock 404. The third split data line 425 carries the third split signal 409 to the slicer circuitry 404, and more specifically, to the high slicer 424 coupled to a high voltage level 410 (e.g., 2 V) defined between the two high voltage levels (e.g., 1 V, 3 V). The high slicer 424 may slice the third split signal 409 into discrete values according to the clock 404. The first split signal 405, the second split signal 407, and the third split signal 409 may be referred to herein as an individual signal or an individual split signal of multiple split signals.

The reference voltage levels 406, 408, and 410 may be based on various voltages. In an example, the reference voltage levels 406, 408, 410 may be defined according to a command. The command may be any number of bits or bytes. The reference voltage levels 406, 408, and 410 may be controlled using switches, switch arrays, resistances, or any combination thereof. Adjusting reference voltage levels can effectively change eye heights or a mask used to identify different eyes of the signal 403.

As a result of the slicing operations, the low slicer 420 outputs a first digital signal 441 on a digital data line 440, the middle slicer 422 outputs a second digital signal 443 on a digital data line 442, and the high slicer 424 outputs a third digital signal 445 on a digital data line 444. In this example, the digital signals 441, 443, and 445 may be intrinsically related to the encoding imparted by the encoder 302 at the host device 104. In other examples, the digital signals 441, 443, and 445 may explicitly relate to the encoding imparted by the encoder 302. That is, the digital signals 441, 443, and 445 may be based on respective voltage masks pertaining to the reference voltage levels and the encoded values. The digital signals 441, 443, and 445 may correspond to symbols defined within the split signals 405, 407, and 409.

A decision-feedback equalizer (DFE) 460, or DFE circuit 460, may be implemented to equalize one or more of the split signals 405, 407, and 409. FIG. 4-1 illustrates an example equalization implementation with one DFE, the DFE 460. As shown, the DFE 460 receives the second digital signal 443 on the digital data line 442 over feedback data line 462. DFE 460 may be disabled through a first switch 464 having a control input 466. The control input 466 may be operated by the memory device 110 or the host device 104. The control input 466 may be operated according to a command. The command may be implemented in various manners, including using operational codes. If the DFE 460 is activate or switched to being connected to the digital data line 442, the DFE 460 can provide a feedback signal or indication to the second split data line 423 on an input side of the middle slicer 422.

The DFE 460 may be connected to a subset of the split data lines 421, 423, and 425. The subset may be lower in quantity than a number of split data lines 421, 423, and 425, which quantity of split data lines is three in this PAM4 example. As shown, the subset may equate to as few as one of the split data lines 421, 423, and 425. Alternatively, the subset may equate to two split lines selected from the split data lines 421, 423, and 425, as shown in FIG. 4-2. The subset may be determined or identified through a variety of ways dependent upon a variety of factors as described herein.

FIG. 4-2 illustrates an example receiver that can implement equalization for pulse-amplitude modulation with multiple (e.g., two) decision-feedback equalizers. The input data line 402 may include or be coupled to one or more impedance matching resisters 472 and 482. The pullup or pulldown impedance matching resistors 472 and 482 may be associated with a $V_{DD}Q$ voltage 470 and a $V_{SS}Q$ voltage 480, respectively. The impedance matching resistors 472 and 482 may be associated with a switching array to properly adjust the impedance seen by the signal 403. The switching array may be configured upon manufacture, with calibration during initialization or regular use, or otherwise. The impedance may affect the signal 403 by skewing, compressing, or otherwise altering eyes 710, 712, and 714 as shown in FIG. 7 and described below. The impedance matching resistors 472 and 482 may be controlled by a command, which may be received from another device (e.g., the host device 104). The command may include various numbers of bits or bytes to set the switches of the switching array and associated resistors to provide a selected impedance.

Similar to FIG. 4-1, the first DFE 460 of the FIG. 4-2 may be implemented to equalize one or more of the split signals 405, 407, and 409. Separately or in combination, a second DFE 450 may be implemented to equalize one or more of the split signals 405, 407, and 409. As shown, the second DFE 450 receives the first digital signal 441 on digital data line 440 over second feedback data line 452. The second DFE 450 may be enabled or disabled through a second switch 454 having a second control input 456 to activate or deactivate DFE functionality. The second control input 456 may be operated by the memory device 110 or the host device 104. The second control input 456 may be operated according to the command for controlling DFE functionality. The command may contain one or more bits for the first switch 464 and the second switch 454.

In example operations, the input data line 402 propagates the signal 403 to slicing circuitry 404. The slicing circuitry 404 may include any number of slicers, such as the low, medium, and high slicers 420, 422, and 424. The slicers 420, 422, and 424 may be adjusted during operation or manufactured according to the type of signal 403 propagated over data line 402. As an example, a PAM4 signal may be sliced by three slicers 420, 422, and 424. Each respective slicer 420, 422, and 424 may comprise at least one respective comparator circuit having a discrete, clock-enabled output. The slicers 420, 422, and 424 may receive a clock signal 404, respective threshold or reference voltage levels 406, 408, and 410, and respective split signals 405, 407, and 409. Based on these inputs, the slicers 420, 422, and 424 respectively output multiple digital signals 441, 443, and 445. The multiple digital data signals 441, 443, and 445 may be discrete with Boolean values. The multiple digital data signals 441, 443, and 445 can propagate over the digital data lines 440, 442, and 444 from the slicers 420, 422, and 424 to the decoder 314. Thus, the digital data lines 440, 442, and 444 may conductively connect the slicers 420, 422, and 424 to the decoder 314.

The second and first DFEs 450 and 460 may each be associated with one or more of the slicers 420, 422, and 424. In the example shown, the lower, second DFE 450 is associated with the lower slicer 420 that operates based on the relatively lower voltage threshold 406. Thus, the lower threshold slicer 420 may be associated with the lower voltage threshold 406. The lower voltage threshold 406 may be −2 V, for instance. Accordingly, the lower threshold slicer 420 can output a digital value (e.g., zero) for voltages of the split signal 405 that are less than −2 V (e.g., −3 V) and can output another digital value (e.g., one) for voltages of the split signal 405 that are greater than −2 V (e.g., +3, +1, or −1 V). The lower DFE 450 may receive a "previous" symbol from the lower digital signal 441 on the lower digital data line 440 via the lower feedback data line 452.

As another decision-feedback equalization circuit, the middle, first DFE 460 is associated with the middle slicer 422 that operates based on the middle voltage threshold 408. Thus, the middle threshold slicer 422 may be associated with the middle voltage threshold 408. The middle voltage threshold 408 may, for instance, be 0.0 V. Accordingly, the middle threshold slicer 422 can output a digital value (e.g., zero) for voltages of the split signal 407 that are less than 0.0 V (e.g., −1 or −3 V) and can output another digital value (e.g., one) for voltages of the split signal 407 that are greater than 0.0 V (e.g., +1 or +3 V). The middle DFE 460 may receive a previous symbol from the middle digital signal 443 on the middle digital data line 442 via the middle feedback data line 462. Example DFE operations are described with reference to FIGS. 5 and 6.

Figure 5:
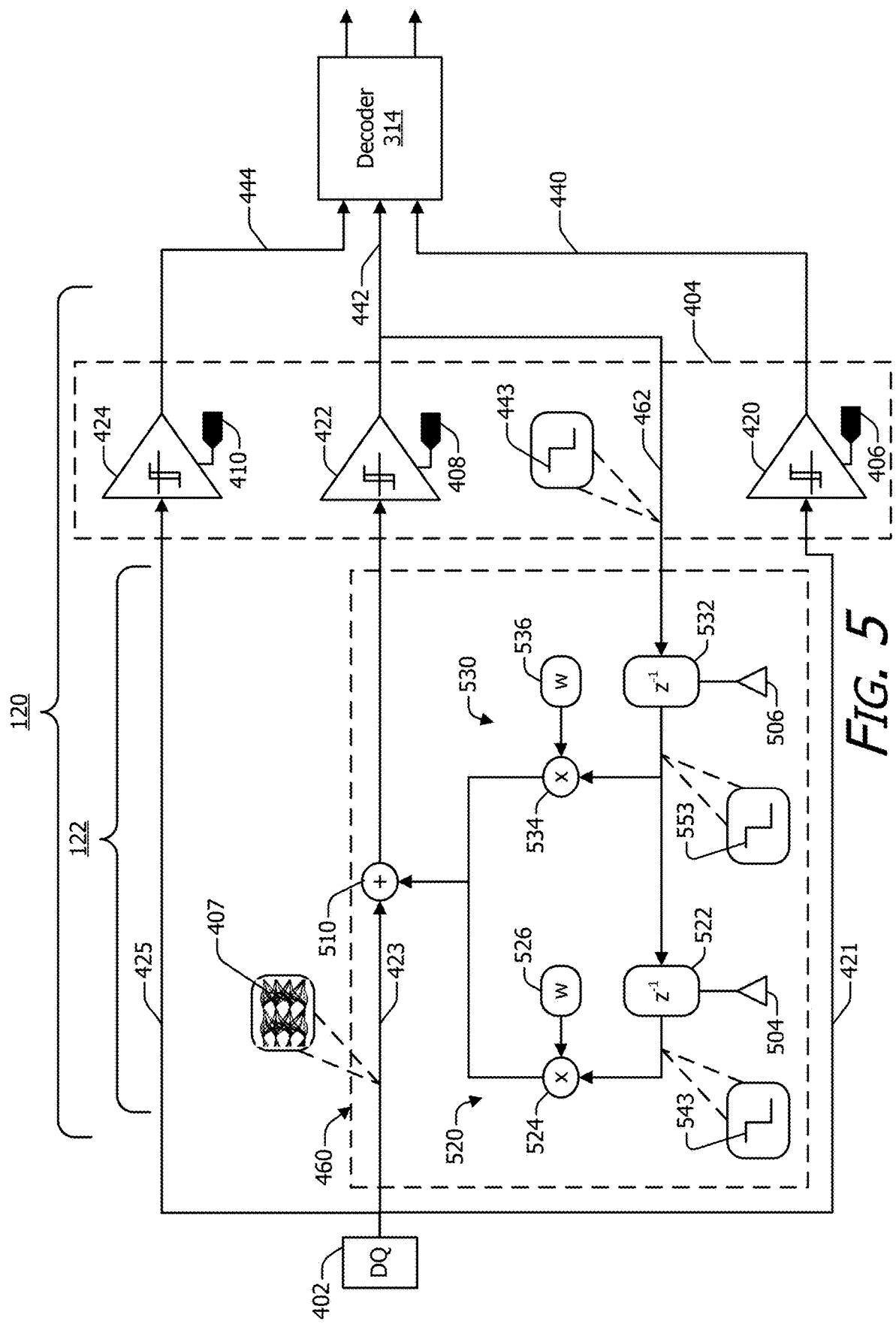
FIG. 5 illustrates a receiver with example DFE circuitry that can implement decision-feedback equalization for pulse-amplitude modulation.

FIG. 5 illustrates a receiver 120 with an example implementation of the slicing circuitry 404 and an example implementation of the first DFE 460. Although not shown in FIG. 5, the second DFE 450 (of FIG. 4-2) may be implemented the same or differently as the depicted first DFE 460. Each respective slicer 420, 422, and 424 of the slicing circuitry 404 may comprise at least a respective comparator as shown in FIG. 5. As described above with reference to FIGS. 4-1 and 4-2, the comparators 420, 422, and 424 can compare a respective split signal 405, 407, and 409 to a respective reference voltage 406, 408, and 410 to produce a respective digital data signal 441, 443, and 445.

In example implementations, the first DFE 460 is coupled between an output of the middle slicer 422 and an input of the middle slicer 422 to provide feedback control or input as part of equalization, such as decision-feedback equalization. The first DFE 460 is coupled to the input of the middle slicer 422 via a summation block 510. In the illustrated example, the first DFE 460 includes multiple taps, such as a first tap 530 and a second tap 520. Each tap 520 and 530 includes a respective delay circuit 522 and 532, a respective weight 526 and 536, and a respective combiner 524 and 534 (e.g., a multiplier).

Each delay circuit 522 and 532 accepts as input the digital signal 443 (including a delayed version thereof) from the digital data line 442 or an output of another delay circuit. Each delay circuit 522 and 532 operates responsive to at least one clock signal 504 and 506. Based on the digital signal 443, each delay circuit 522 and 532 produces a respective delayed digital signal 543 and 553, which is forwarded to the respective combiner 524 and 534. The combiners 524 and 534 combine the respective delayed digital signals 543 and 553 with the respective weights 526 and 536 to produce weighted signals at the outputs thereof. These respective weighted signals are coupled from the outputs of the combiners 524 and 534 to the summation block 510. The summation block 510 applies the multiple weighted signals to the split signal 407 to provide equalization. The equalization can improve operation of the middle slicer 422 to enable the middle eye (as described with reference to FIG. 7) to be compressed while maintaining a targeted level of performance.

In example operations, the input data line 402 provides the split signal 407 to the middle slicer 422 through the summation block 510. The summation block 510 can be implemented in any manner with circuitry that can combine (e.g., add or subtract) two or more signals. During a first clock cycle of the clock signal 404 (of FIGS. 4-1 and 4-2), the split signal 407 is received by the middle slicer 422. The middle slicer 422 outputs the digital signal 443 on the digital data line 442 based on the split signal 407 and the reference voltage level 408 and responsive to the clock signal 404. The first DFE 460 accepts the digital signal 443 via the middle feedback data line 462. The delay circuit 532 can implement a discrete time delay according to the clock signal 506 to produce a "previous" symbol 553. The previous symbol 553 is altered and weighted based on the first weight 536 by the first multiplier 534.

An output of the first multiplier 534 is joined with an output of the second multiplier 524. The output of the second multiplier 524 can be produced similarly. The second multiplier 524, however, operates on another previous symbol 543 that is further delayed relative to the previous symbol 553 by the delay circuit 522 responsive to the clock signal 504. Thus, the second multiplier 524 produces an output for the second tap 520 based on the second previous symbol 543 and the second weight 526. The first and second outputs of the first and second taps 530 and 520 are thus joined at or otherwise combined by the summation block 510. The summation block 510 thus combines the joined weighted signals from the taps 520 and 530 with the split signal 407, which modifies the split signal 407. The middle slicer 422 then accepts the modified split signal 407 for symbol determination. Although the first DFE 460 is described in terms of two taps 520 and 530, first DFE 460 (or another DFE) may alternatively have more or fewer taps (e.g., one tap, three taps, or six taps).

Thus, FIG. 5 illustrates an example receiver 120 that can implement decision-feedback equalization for PAM with a DFE. The weights of the first DFE 460 may be adjusted to improve the slicing results of the middle slicer 422, the decoding results of the decoder 314, or a combination thereof. The weight tuning may be performed by, for example, the memory device 110, the memory controller 118, another part of the host device 104, and so forth. The example receiver 120 of FIG. 5 performs DFE based on one or more "common" symbols, or symbols obtained from one slicer path, like the slicer path to which DFE is being applied. A receiver 120 may, however, operate using "uncommon" symbols.

Figure 6:
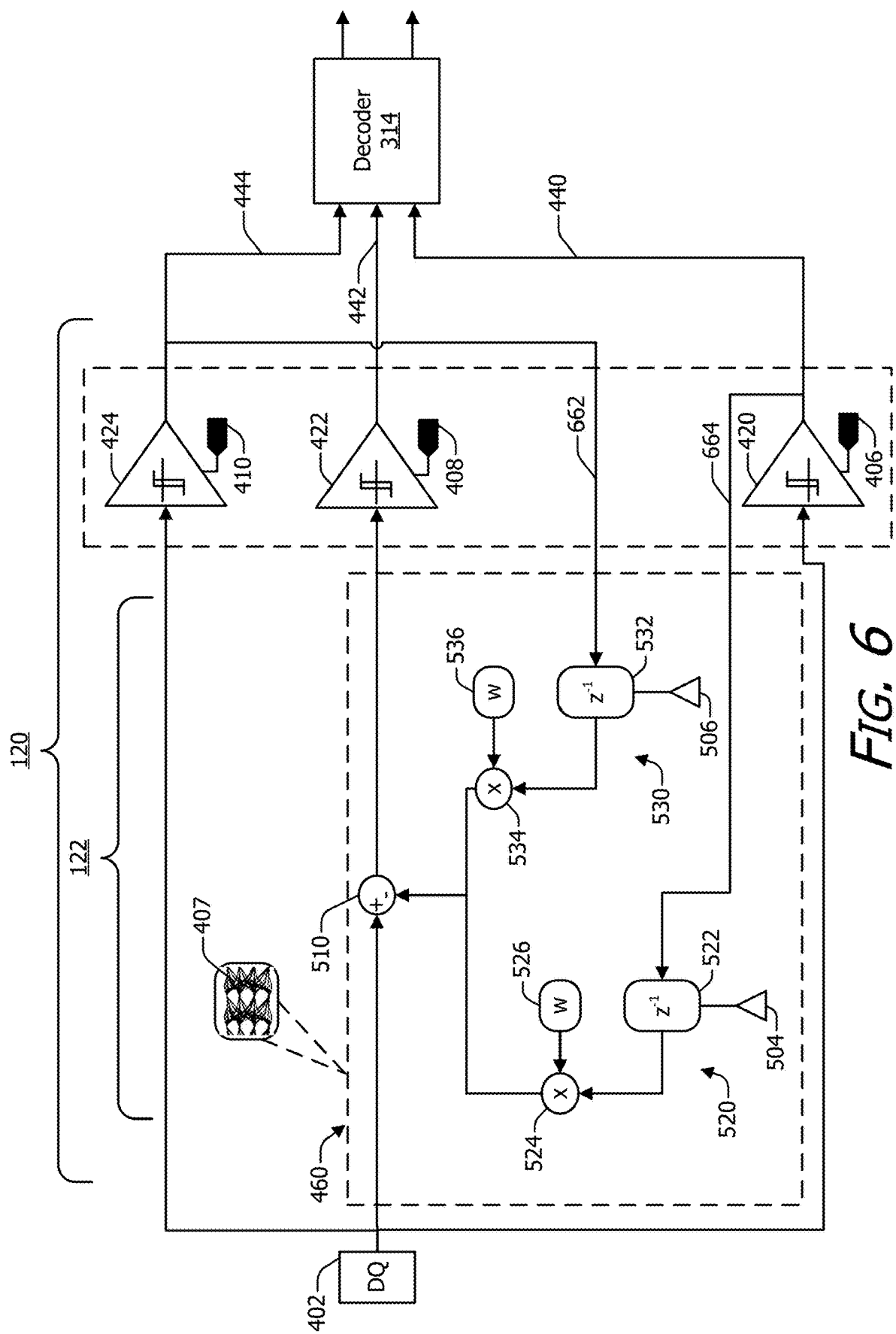
FIG. 6 illustrates a receiver with other example DFE circuitry that can implement decision-feedback equalization for pulse-amplitude modulation based on uncommon symbols.

FIG. 6 illustrates another example of the receiver 120 that can implement decision-feedback equalization, but the receiver 120 employs a first DFE 460 that operates based on uncommon symbols. As used herein, uncommon symbols can refer to those symbols that are routed from multiple slicer paths or from at least one slicer path to which the given DFE is not being applied. Accordingly, the first DFE 460 obtains a first symbol from a first feedback data line 662 that is coupled to the output of the high slicer 424 and a second symbol from a second feedback data line 664 that is coupled to the output of the low slicer 420. Meanwhile, the first DFE 460 is associated with and applied to the middle slicer 422.

During example operations, the first delay circuit 532 produces a first delayed symbol based on the first symbol obtained from the digital data line 444. Similarly, the second delay circuit 522 produces a second delayed symbol based on the second symbol obtained from the digital data line 440. The first and second multipliers 534 and 524 therefore produce tap outputs for the first and second taps 530 and 520 respectively based on the first and second delayed symbols. The first and second multipliers 534 and 524 provide the tap outputs to the summation block 510 to provide feedback to the input of the middle slicer 422. In other implementations, the uncommon symbols may be obtained from fewer than all the other slicers. Further, a DFE may operate based on both common and uncommon symbols. Additionally or alternatively, the taps for the uncommon symbols may be arranged to process symbols with more than one delay relative to the slicer outputs, analogously to the taps depicted in FIG. 5. In these manners, equalization for PAM may be implemented by at least one DFE, which is associated with fewer than all slicers of a receiver 120, using one or more uncommon symbols obtained from one or more other slicers.

FIG. 7 illustrates an example signal 403 having four pulse-amplitude-modulated levels that can be used with equalization for PAM. FIG. 7 depicts a graph 700 including an abscissa or "X" axis 704 that denotes time and an ordinate or "Y" axis 702 that denotes voltage. The time axis 704 spans 0 to 350 picoseconds (psec), and the voltage axis 702 ranges from −0.1 V to 0.5 V. The example signal 403 includes or is associated with a maximum voltage range 708 that extends between a lowest voltage level and a highest voltage level. With a PAM4 signaling scheme, the signal 403 has four voltage levels, including a lowest, a highest, and two in between. The signal 403 also includes or is associated with a symbol period 706.

In example implementations, the symbol period 706 corresponds to a length of time during which the signal 403 can communicate one symbol. Accordingly, the signal 403 makes a voltage level transition each symbol period 706. The potential transitions during a given symbol period 706 form multiple eyes. With the four voltage levels of PAM4, the signal 403 is associated with three eyes: a first or low/lower eye 710, a second or middle eye 712, and a third or high/upper eye 714. Each respective eye 710, 712, and 714 can have a respective eye height 720, 722, and 724. The low eye height 720, the middle eye height 722, and the high eye height 724 are respectively associated with the low reference voltage level 406, the middle reference voltage level 408, and the high reference voltage level 410.

As interconnect transmission frequencies have increased, the size or width of the symbol period 706 has decreased. This decreased period renders symbol detection increasingly more difficult. Although DFE can improve the accuracy of symbol detection, DFE circuitry can be power hungry and consume appreciable area on an IC chip. Accordingly, this document describes applying DFE to fewer than all the slicers of a receiver to save power and reduce an area footprint of DFE circuitry. A DFE circuit can be applied, for example, to the middle slicer 422 that corresponds to the middle eye 712 while excluding the upper eye 714 and/or the lower eye 710 from DFE processing.

During any given symbol period 706, the middle slicer 422 determines if a current voltage of the signal 403 is above or below the middle reference voltage level 408. The other slicers may make analogous determinations or symbol decisions. The available time and corresponding voltage headroom to make such determinations can be impacted by the eye heights 720, 722, and 724. The lower and upper eye heights 720 and 724 can, for example, be expanded to improve the reliability of the voltage comparisons. As described herein, these eye heights can be manipulated through encoding techniques, impedance terminations, adjustments to reference voltage levels, and so forth.

Increasing the eye heights 720 and 724, however, decreases or squeezes the middle eye height 722. This can reduce the intrinsic reliability of the comparison of a middle split signal 407 to the middle reference voltage level 408 by the middle slicer 422. On the other hand, employing DFE with the middle slicer 422 can improve the symbol recognition reliability and counterbalance the narrower middle eye 712 that can result from expanding one or more other eyes. In these manners, DFE can be applied to a subset of the slicers 420, 422, and 424 while still maintaining a target accuracy for symbol detection. In this context, the subset of slicers may correspond to a quantity of slicers (e.g., as few as one) that is less than a total quantity of slicers. Further, the subset of slicers can comprise a proper subset of slicers that includes fewer than all the slicers in the set of "total" slicers.

Example Methods

Figure 8:
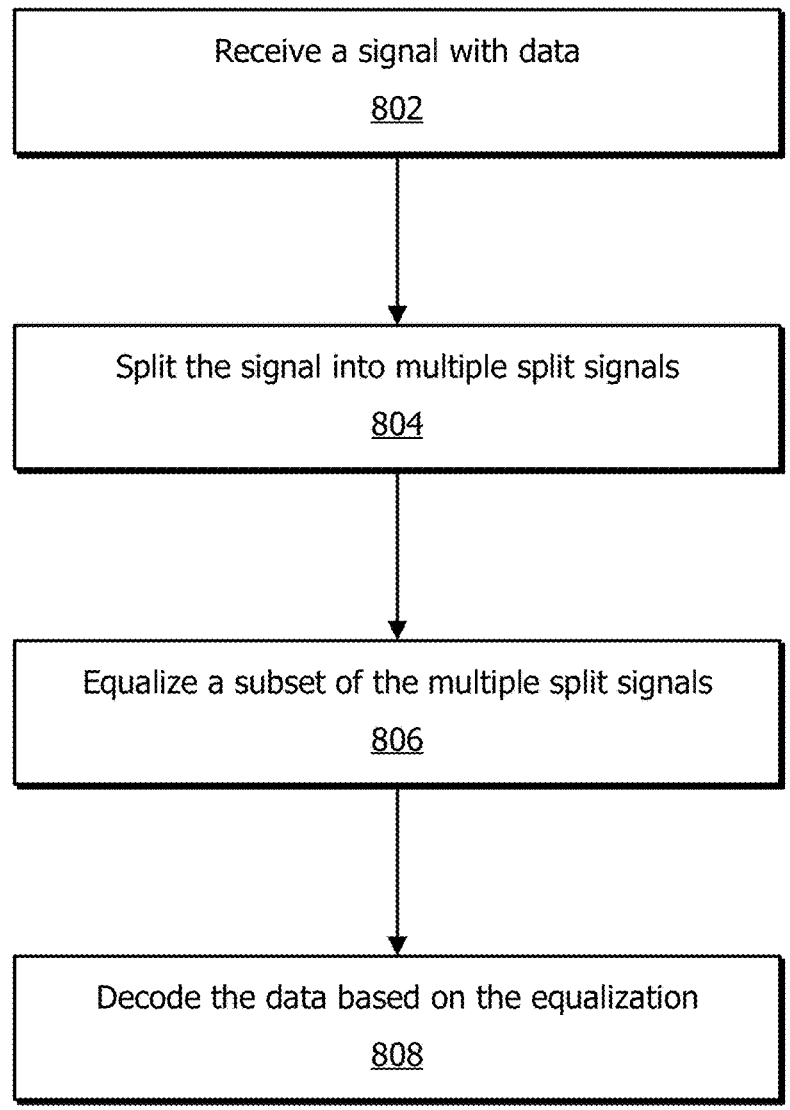
FIG. 8 illustrates an example method that can implement equalization for pulse-amplitude modulation.

This section describes example methods for equalization with pulse-amplitude modulation by referring to the flow chart/flow diagram of FIG. 8. This description may also refer to components, entities, and other aspects depicted in FIGS. 1-7, which reference is made by way of example only. The described methods are not necessarily limited to performance by one entity or multiple entities operating on a single device.

At block 802 of a process 800, a device is receiving a signal, with the signal carrying data encoded using three or more voltage levels. For example, a receiver 120 of a memory device 110 can receive a signal 403, with the signal 403 carrying data encoded using three or more voltage levels. In some cases, the signal 403 may comprise a PAM4 signal (with four voltage levels), a PAM8 signal (with eight voltage levels), or a signal with another higher order modulation scheme. The memory device 110 may receive the signal 403 from a memory controller 118 of a host device 104 via an interconnect 106. Additionally or alternatively, the host device 104, including the memory controller 118 thereof, may include a receiver 120 that performs the operations of the process 800.

At block 804, the device is splitting the signal into multiple split signals, with the multiple split signals having a quantity greater than two. For example, an input data line 402 of the receiver 120 can split the signal 403 into multiple split signals 405, 407, and 409. Here, the multiple split signals 405, 407, and 409 have a quantity greater than two, such as three. The input data line 402 may, for instance, split into multiple split data lines 421, 423, and 425 to split the signal 403 into multiple split signals 405, 407, and 409.

With the signal splitting, a respective split signal of the multiple split signals 405, 407, and 409 may be routed to a respective slicer of multiple slicers 420, 422, and 424. A slicer may compare a respective split signal 405, 407, and 409 to a respective reference voltage level 406, 408, and 410. Based on the respective comparisons, a slicer may output a respective digital signal of multiple digital signals 441, 443, and 445 on respective digital data lines 440, 442, and 444. Slicer circuitry 404 may provide the multiple digital signals 441, 443, and 445 to a decoder 314. One or more of the multiple digital signals 441, 443, and 445 may also be used to provide decision-feedback equalization.

At block 806, the device is equalizing a subset of the multiple split signals, with the subset being less than the quantity of the multiple split signals. For example, at least one DFE 460 of the receiver 120 can equalize a subset of the multiple split signals 405, 407, and 409. The subset can be less than the quantity of the multiple split signals 405, 407, and 409. With a PAM4 implementation, the subset may be less than three—e.g., the subset may include one or two split signals or split data lines. Thus, the receiver 120 may equalize one split signal 407 with a first DFE 460 or may equalize two split signals 407 and 405 with first and second DFEs 460 and 450, respectively. At least one split signal (e.g., at least the high split signal 409) is not equalized in this example.

At block 808, the device is decoding the data based on the equalizing. For example, the decoder 314 can decode the data of the signal 403 based on the equalization. To do so, the decoder 314 may accept the multiple digital signals 441, 443, and 445 from the slicer circuitry 404. The decoder 314 may produce a multibit symbol (e.g., a "00" or a "10" for PAM4 signaling) based on the digital values (e.g., a digital bit value of "0" or "1") of the multiple digital signals 441, 443, and 445. By using fewer DFE(s) than slicers, circuit size and power usage can be reduced. Further, by manipulating one or more eye sizes of the signal 403, symbol decoding accuracy and data transmission reliability can be maintained while lowering power usage and component costs.

For the flow chart or flow diagram described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses, components, or other aspects shown in FIGS. 1-7, the components of which may be further divided, combined, rearranged, and so on. The devices and components of these figures generally represent hardware, such as electronic devices, packaged modules, IC chips, or circuits; firmware or the actions thereof; software; or a combination thereof. With reference to FIGS. 1-7, in some cases, a host device 104 or a memory device 110 may individually perform the operations of these methods. In other cases, a host device 104 and a memory device 110 may jointly perform the operations. FIGS. 1-7 illustrate example circuitry that may perform at least some of these operations. Thus, these figures illustrate some of the many possible systems or apparatuses capable of implementing the described methods.

Examples of multiple implementations are described below.

Example 1

A method comprising: receiving a signal, the signal carrying data encoded using three or more voltage levels; splitting the signal into multiple split signals, the multiple split signals having a quantity greater than two; equalizing a subset of the multiple split signals, the subset being less than the quantity of the multiple split signals; and decoding the data based on the equalizing.

Example 2

The method of example 1, wherein an individual split signal of the subset of the multiple split signals is associated with an eye according to a symbol period of the signal, the eye having an eye height less than another eye height corresponding to the signal.

Example 3

The method of one of example 1 or example 2, wherein the eye height is caused to be less than the other eye height by an encoding of the data.

Example 4

The method of any one of the preceding examples, wherein the data is encoded with an encoding algorithm that avoids maximum voltage level transitions for the signal.

Example 5

The method of any one of the preceding examples, wherein the eye height is compressed to be less than the other eye height by an impedance associated with the signal.

Example 6

The method of any one of the preceding examples, further comprising: altering an impedance used to propagate the signal to cause the eye height to be less than the other eye height.

Example 7

The method of any one of the preceding examples, further comprising: comparing the multiple split signals to multiple reference voltage levels to produce multiple digital signals; equalizing the subset of the multiple split signals using at least one digital signal of the multiple digital signals; and decoding the data based on the multiple digital signals.

Example 8

The method of any one of the preceding examples, wherein an individual split signal of the subset of the multiple split signals is associated with an eye according to a symbol period of the signal, with the eye having an eye height less than another eye height of another eye that is associated with a different split signal of the multiple split signals.

Example 9

The method of any one of the preceding examples, further comprising: applying a decision feedback equalizer to the subset of the multiple split signals to equalize the signal.

Example 10

The method of any one of the preceding examples, further comprising: applying a weight associated with each individual split signal of the subset of the multiple split signals.

Example 11

The method of any one of the preceding examples, further comprising: applying a weight associated with the subset of the multiple split signals.

Example 12

The method of any one of the preceding examples, further comprising: biasing a received symbol encoded in the data defined at least partly by an individual split signal of the subset of the multiple split signals based on a previous symbol associated with the individual split signal to equalize the individual split signal.

Example 13

The method of any one of the preceding examples, wherein the previous symbol comprises a most-recently received symbol associated with the individual split signal.

Example 14

The method of any one of the preceding examples, further comprising: biasing a received symbol encoded in the data defined at least partly by an individual split signal of the subset of the multiple split signals based on a previous symbol associated with a second split signal of the multiple split signals, the second split signal different from the individual split signal.

Example 15

The method of any one of the preceding examples, further comprising: biasing the received symbol based on a previous symbol associated with a third split signal of the multiple split signals, the third split signal different from the individual split signal and the second split signal.

Example 16

A memory device comprising: an interface having an input data line configured to provide a signal, the input data line split into multiple split data lines configured to propagate multiple split signals based on the signal, the multiple split data lines having a quantity greater than two; equalization circuitry coupled to a subset of the multiple split data lines less than the quantity of the multiple split data lines, the equalization circuitry configured to equalize a subset of the multiple split signals associated with the subset of the multiple split data lines; and decoder circuitry coupled to the multiple split data lines, the decoder circuitry configured to decode symbols associated with the multiple split signals according to the equalization circuitry.

Example 17

The memory device of example 16, further comprising: slicer circuitry coupled to the multiple split data lines, the slicer circuitry comprising multiple comparators configured to compare the multiple split signals with multiple reference voltage levels to produce multiple digital signals.

Example 18

The memory device of one of example 16 or example 17, wherein the equalization circuitry comprises a decision-feedback equalizer associated with a comparator of the multiple comparators.

Example 19

The memory device of any one of examples 16-18, wherein the decision-feedback equalizer includes a summer configured to adjust a received symbol of the signal associated with the comparator based on a weight and a previous symbol received by the decision-feedback equalizer.

Example 20

The memory device of any one of examples 16-19, wherein the previous symbol received by the decision-feedback equalizer is determined at least partly by the comparator.

Example 21

The memory device of any one of examples 16-20, wherein the previous symbol received by the decision-feedback equalizer is determined at least partly by a second comparator of the multiple comparators.

Example 22

The memory device of any one of examples 16-21, wherein the previous symbol received by the decision-feedback equalizer is associated with the second comparator and a third comparator of the multiple comparators.

Example 23

The memory device of any one of examples 16-22, wherein the second comparator and a third comparator of the multiple comparators correspond to a maximum voltage level transition of the signal.

Example 24

The memory device of any one of examples 16-23, further comprising: one or more terminations coupled to the input data line, the one or more terminations having impedances configured to compress an eye height associated with an eye of the signal, the eye defined according to a symbol period of the signal, the eye height associated with a threshold of at least one comparator of the multiple comparators such that the eye height is less than another eye height of another eye defined according to the symbol period of the signal.

Example 25

The memory device of any one of examples 16-24, further comprising: one or more terminations coupled to the input data line, the one or more terminations having impedances configured to compress two or more eye heights associated with respective eyes of the signal, the respective eyes defined according to a symbol period of the signal, the two or more eye heights associated with thresholds of two or more comparators of the multiple comparators such that the respective eyes have an eye height of the two or more eye heights that is less than at least one other eye height defined according to the symbol period of the signal.

Example 26

The memory device of any one of examples 16-25, wherein the decoder circuitry is configured to decode the signal having an encoding that compresses an eye height associated with an eye of the signal, the eye defined according to a symbol period of the signal.

Example 27

A method comprising: receiving data from a memory controller according to a signal propagated using a pulse amplitude modulation (PAM) having at least four levels; splitting the signal into multiple split signals; applying decision-feedback equalization to a portion of the multiple split signals; transmitting the data to the memory controller after the applying; and receiving from the memory controller a command to configure the decision-feedback equalization.

Example 28

The method of example 27, wherein the command is associated with at least one switch coupled to a decision-feedback equalizer circuit.

Example 29

The method of one of example 27 or example 28, further comprising: closing the at least one switch based on the command to engage the decision-feedback equalizer circuit.

Example 30

The method of any one of examples 27-29, wherein the at least one switch can selectively couple the decision-feedback equalizer circuit to different split data lines respectively associated with different split signals of the multiple split signals.

Example 31

The method of any one of examples 27-30, further comprising: receiving second data from the memory controller; bypassing the decision-feedback equalizer circuit based on the command; and decoding the second data based on the bypassing.

Example 32

The method of any one of examples 27-31, wherein the command is associated with at least one reference voltage level corresponding to at least one comparator, the at least one comparator associated with a subset of the multiple split signals, the subset being less than a quantity of the multiple split signals.

Example 33

The method of any one of examples 27-32, further comprising: adjusting the at least one reference voltage level according to the command.

Example 34

The method of any one of examples 27-33, further comprising: receiving second data from the memory controller according to a second signal; splitting the second signal into multiple second split signals; equalizing a subset of the multiple second split signals based on the adjusting, the subset being less than a quantity of the multiple second split signals; and decoding the second data based on the equalizing.

Example 35

The method of any one of examples 27-34, wherein the command is associated with at least one impedance corresponding to an input data line.

Example 36

The method of any one of examples 27-35, further comprising: adjusting the at least one impedance according to the command.

Example 37

The method of any one of examples 27-36, further comprising: receiving, via the input data line, second data from the memory controller according to a second signal; splitting the second signal into multiple second split signals; equalizing a subset of the multiple second split signals based on the adjusting, the subset being less than a quantity of the multiple second split signals; and decoding the second data based on the equalizing.

Example 38

A method comprising: transmitting, from a memory controller to a memory device, data using a signal with a pulse amplitude modulation (PAM) having at least four levels; receiving, by the memory controller, other data from the memory device responsive to the transmitting of the data; and transmitting, from the memory controller, a command to configure decision-feedback equalization at the memory device responsive to the data and the other data.

Example 39

The method of example 38, further comprising: comparing the data to the other data; and determining the command based on the comparing.

Example 40

The method of one of example 38 or example 39, further comprising: transmitting, from the memory controller to the memory device, a request to read the data, wherein the receiving comprises receiving the other data from the memory device responsive to the request.

Example 41

The method of any one of examples 38-40, further comprising: encoding the data carried by the signal to cause an eye height of the signal to be less than another eye height of the signal.

Example 42

The method of any one of examples 38-41, wherein the command is configured to cause the memory device to engage the decision-feedback equalization at the memory device.

Example 43

The method of any one of examples 38-42, wherein the command is configured to cause the memory device to couple a decision-feedback equalizer circuit to a split data line of multiple split data lines, the command indicative of the split data line.

Example 44

The method of any one of examples 1-15, wherein: the data is encoded with an encoding algorithm that avoids maximum voltage level transitions for the signal, or wherein the eye height is compressed to be less than the other eye height by an impedance associated with the signal.

Example 45

The memory device of any one of examples 16-26, wherein the previous symbol received by the decision-feedback equalizer is determined at least partly by the comparator or at least partly by a second comparator of the multiple comparators.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although implementations for equalization with pulse-amplitude modulation have been described in language specific to certain features and/or methods, the subject of the appended claims is not necessarily limited to the specific features or methods described. Rather, the specific features and methods are disclosed as example implementations for equalization for pulse-amplitude modulation.

What is claimed is:

1. A method comprising:
   receiving a signal, the signal carrying data encoded using three or more voltage levels;
   splitting the signal into multiple split signals;
   slicing the multiple split signals to produce multiple digital signals, the multiple digital signals having a quantity greater than two;
   equalizing a subset of the multiple digital signals, the subset being less than the quantity of the multiple digital signals; and
   decoding the data based on the equalizing and using at least a portion of the multiple digital signals, the portion including at least one digital signal of the subset that is equalized and at least one other digital signal that is not part of the subset that is equalized.

2. The method of claim 1, wherein an individual split signal of the multiple split signals is associated with an eye according to a symbol period of the signal, the eye having an eye height less than another eye height corresponding to the signal, the individual split signal associated with the at least one digital signal of the subset that is equalized.

3. The method of claim 2, wherein the eye height is caused to be less than the other eye height by an encoding of the data.

4. The method of claim 2, wherein the data is encoded with an encoding algorithm that avoids maximum voltage level transitions for the signal.

5. The method of claim 2, wherein the eye height is compressed to be less than the other eye height by an impedance associated with the signal.

6. The method of claim 2, further comprising:
   altering an impedance used to propagate the signal to cause the eye height to be less than the other eye height.

7. The method of claim 1, further comprising:
   comparing the multiple split signals to multiple reference voltage levels to produce the multiple digital signals.

8. The method of claim 1, wherein an individual split signal of the multiple split signals is associated with an eye according to a symbol period of the signal, the eye having an eye height less than another eye height of another eye that is associated with a different split signal of the multiple split signals, the individual split signal associated with the at least one digital signal of the subset that is equalized, the different split signal associated with the at least one other digital signal that is not part of the subset that is equalized.

9. The method of claim 1, further comprising:
   applying a decision feedback equalizer to the subset of the multiple digital signals to equalize the signal.

10. The method of claim 9, further comprising:
    applying a weight associated with each individual digital signal of the subset of the multiple digital signals.

11. The method of claim 9, further comprising:
    applying a weight associated with the subset of the multiple digital signals.

12. The method of claim 1, further comprising:
    biasing a received symbol encoded in the data defined at least partly by an individual digital signal of the subset of the multiple digital signals based on a previous symbol associated with the individual digital signal to equalize the individual digital signal.

13. The method of claim 12, wherein the previous symbol comprises a most-recently received symbol associated with the individual digital signal.

14. The method of claim 1, further comprising:
    biasing a received symbol encoded in the data defined at least partly by an individual digital signal of the subset of the multiple digital signals based on a previous symbol associated with a second digital signal of the multiple digital signals, the second digital signal different from the individual digital signal.

15. The method of claim 14, further comprising:
    biasing the received symbol based on a previous symbol associated with a third digital signal of the multiple digital signals, the third digital signal different from the individual digital signal and the second digital signal.

16. A memory device comprising:
    an interface having an input data line configured to provide a signal, the input data line being split into multiple split data lines configured to propagate multiple split signals based on the signal;
    slicer circuitry coupled to the multiple split data lines, the slicer circuitry configured to produce multiple digital signals on multiple digital data lines based on the multiple split signals, the multiple digital data lines having a quantity greater than two;
    equalization circuitry coupled to a subset of the multiple digital data lines less than the quantity of the multiple digital data lines, the equalization circuitry configured to equalize a subset of the multiple digital signals associated with the subset of the multiple digital data lines; and
    decoder circuitry coupled to the multiple digital data lines, the decoder circuitry configured to decode symbols associated with the multiple digital signals, including at least one digital signal of the subset of the multiple digital signals that is equalized and at least one other digital signal that is not part of the subset of the multiple digital signals that is equalized.

17. The memory device of claim 16, wherein the slicer circuitry comprises multiple comparators configured to compare the multiple split signals with multiple reference voltage levels to produce the multiple digital signals.

18. The memory device of claim 17, wherein the equalization circuitry comprises a decision-feedback equalizer associated with a comparator of the multiple comparators.

19. The memory device of claim 18, wherein the decision-feedback equalizer includes a summer configured to adjust a received symbol of the signal associated with the comparator based on a weight and a previous symbol received by the decision-feedback equalizer.

20. The memory device of claim 19, wherein the previous symbol received by the decision-feedback equalizer is determined at least partly by the comparator.

21. The memory device of claim 19, wherein the previous symbol received by the decision-feedback equalizer is determined at least partly by a second comparator of the multiple comparators.

22. The memory device of claim 21, wherein the previous symbol received by the decision-feedback equalizer is associated with the second comparator and a third comparator of the multiple comparators.

23. The memory device of claim 21, wherein the second comparator and a third comparator of the multiple comparators correspond to a maximum voltage level transition of the signal.

24. The memory device of claim 17, further comprising:
one or more terminations coupled to the input data line, the one or more terminations having one or more impedances configured to compress an eye height associated with an eye of the signal, the eye defined according to a symbol period of the signal, the eye height associated with a threshold of at least one comparator of the multiple comparators such that the eye height is less than another eye height of another eye defined according to the symbol period of the signal.

25. The memory device of claim 17, further comprising:
one or more terminations coupled to the input data line, the one or more terminations having one or more impedances configured to compress two or more eye heights associated with respective eyes of the signal, the respective eyes defined according to a symbol period of the signal, the two or more eye heights associated with thresholds of two or more comparators of the multiple comparators such that the respective eyes have a respective eye height of the two or more eye heights that is less than at least one other eye height defined according to the symbol period of the signal.

26. The memory device of claim 16, wherein the decoder circuitry is configured to decode the signal having an encoding that compresses an eye height associated with an eye of the signal, the eye defined according to a symbol period of the signal.

27. A method comprising:
receiving test data from a memory controller according to a signal propagated using a pulse amplitude modulation (PAM) having at least four levels;
splitting the signal into multiple split signals;
slicing the multiple split signals to produce multiple digital signals;
applying decision-feedback equalization to a portion of the multiple digital signals;
decoding the test data based on the applying and using at least the portion of the multiple digital signals and at least one digital signal of the multiple digital signals that is separate from the portion to which decision-feedback equalization is applied;
transmitting the test data to the memory controller after the decoding; and
receiving from the memory controller a command to configure the decision-feedback equalization based on the transmitting.

28. The method of claim 27, wherein the command is associated with at least one switch coupled to a decision-feedback equalizer circuit.

29. The method of claim 28, further comprising:
closing the at least one switch based on the command to engage the decision-feedback equalizer circuit.

30. The method of claim 29, wherein the at least one switch is configured to selectively couple the decision-feedback equalizer circuit to different digital data lines respectively associated with different digital signals of the multiple digital signals.

31. The method of claim 28, further comprising:
receiving data from the memory controller;
bypassing the decision-feedback equalizer circuit based on the command; and
decoding the data based on the bypassing.

32. The method of claim 27, wherein the command is associated with at least one reference voltage level corresponding to at least one comparator, the at least one comparator associated with a subset of the multiple split signals, the subset being less than a quantity of the multiple split signals.

33. The method of claim 32, further comprising:
adjusting the at least one reference voltage level according to the command.

34. The method of claim 33, further comprising:
receiving data from the memory controller according to a second signal;
splitting the second signal into multiple second split signals;
slicing the multiple second split signals to produce multiple second digital signals based on the adjusting;
equalizing a subset of the multiple second digital signals, the subset being less than a quantity of the multiple second digital signals; and
decoding the data based on the equalizing.

35. The method of claim 27, wherein the command is associated with at least one impedance corresponding to an input data line.

36. The method of claim 35, further comprising:
adjusting the at least one impedance according to the command.

37. The method of claim 36, further comprising:
receiving, via the input data line, data from the memory controller according to a second signal and based on the adjusting;
splitting the second signal into multiple second split signals;
slicing the multiple second split signals to produce multiple second digital signals;
equalizing a subset of the multiple second digital signals, the subset being less than a quantity of the multiple second digital signals; and
decoding the data based on the equalizing.

38. A method comprising:
transmitting, from a memory controller to a memory device, test data using a signal with a pulse amplitude modulation (PAM) having at least four levels;
transmitting, from the memory controller to the memory device, a request to read the test data;
receiving, by the memory controller, data from the memory device responsive to the transmitting of the request to read the test data;
adjusting, by the memory controller, one or more of various parameters to reduce an error associated with the test data;
determining, by the memory controller, a command to configure decision-feedback equalization at the memory device responsive to the reduced error associated with the test data; and
transmitting, from the memory controller to the memory device, the command to cause the memory device to selectively engage the decision-feedback equalization.

39. The method of claim 38, further comprising:
determining, by the memory controller, the command to cause the memory device to apply the decision-feedback equalization to at least one slicer path of multiple slicer paths.

40. The method of claim 39, further comprising:
determining, by the memory controller, the command to cause the memory device to apply the decision-feedback equalization to a proper subset of a total set of the multiple slicer paths using at least one switch.

41. The method of claim 38, further comprising:
encoding the test data carried by the signal to cause an eye height of the signal to be less than another eye height of the signal.

42. The method of claim 38, wherein the command is configured to adjust at least one of a termination impedance or a slicer threshold at the memory device.

43. The method of claim 38, wherein the command is configured to cause the memory device to couple a decision-feedback equalizer circuit to a digital data line of multiple digital data lines, the command indicative of the digital data line.

\* \* \* \* \*